July 1, 1969     E. C. ADAMS, JR., ET AL     3,453,363
CHORIONIC GONADOTROPIN PURIFICATION PROCESS
Filed June 20, 1966

INVENTORS
JOHN MENLEY YODER
ERNEST CLARENCE ADAMS, JR.
BY Gary L. Jordan
ATTORNEY

United States Patent Office 3,453,363
Patented July 1, 1969

3,453,363
CHORIONIC GONADOTROPIN PURIFICATION PROCESS
Ernest Clarence Adams, Jr., and John Menley Yoder, Elkhart, Ind., assignors to Miles Laboratories, Inc., Elkhart, Ind., a corporation of Indiana
Filed June 20, 1966, Ser. No. 558,961
Int. Cl. A61k 17/08
U.S. Cl. 424—100                             5 Claims

ABSTRACT OF THE DISCLOSURE

A process for purifying commercially available human chorionic gonadotropin (HCG) utilizing DEAE-cellulose or DEAE-dextran chromatographic column, wherein step-wise use of at least two sodium phosphate buffers having molarities in the range 0.004 to 0.05 molar is required and the second applied buffer has a molarity greater than the first.

---

This invention relates to a column chromatography process for separating a purified chorionic gonadotropin from contaminating proteins present in commercial preparations of this hormone.

Purified chorionic gonadotropin (HCG) is of interest in the preparation of tests by which HCG or closely related proteins may be detected. HCG levels in one or more body fluids are altered by the conditions of: pregnancy and the presence of hydatidiform moles, malignant tumors of the placenta, malignant neoplasm of the testes, and embryonal cell carcinoma. For a test of the highest specificity purified HCG and the antibody thereto (HCG-Ab) are both needed, but an adequate test can be constructed if either one is purified. If the HCG preparation used for making the usual test composition for a pregnancy test is not free from contaminating proteins the indicator particles used in the test will have both HCG and a large amount of contaminating proteins attached thereto and the antisera recovered from animals injected with this same preparation will contain antibodies specific to these protein contaminants and the resulting test will tend to give false positives for the determination being made. However, if either the HCG or its antibody are taken from a purified fraction recovered by the present process a test system free from such false positive results can be constructed.

Thus, the purification of HCG is important both in order to have a purified protein with which to construct the test composition and to use for injection into laboratory animals for production of a purified antiserum for use in the test. A pregnancy test in which the purified HCG of this invention and its antibody allow greater specificity is disclosed in U.S. Patent No. 3,236,732 to E. R. Arquilla. By use of the present purification process a purified HCG and its antibody are available for improving the efficiency of the test described therein.

Past purification processes for chorionic gonadotropin have been generally inadequate to accomplish the specific purpose of freeing a purified chorionic gonadotropin from the associated contaminant proteins as detected by immuno-chemical methods. Part of these contaminant proteins are included in commercially available preparations due to the standard methods used for collection of the chorionic gonadotropin. It is often collected by concentration from pregnancy urine samples by first adsorbing the urine samples with benzoic acid, kaolin or permutit and thereafter precipitating with acetone or ethanol. The resulting solute is dried and shipped in powder form. Obviously, such a non-specific chemical recovery process, which involves processing large quantities of urine, does not exclude the adsorption and later precipitation of both normal and abnormal urine contaminants present in the particular urine samples. These contaminant proteins have, in the past, been removed by such processes as adsorption with kaolin and re-extraction with various solvents or by use of column chromatography. Adsorption of the antisera to this impure preparation with non-pregnant urine extracts, has also been used to remove contaminants. These recovery processes have also been used with generally greater success for recovery of HCG from sources having known high activity, such as urine from choriocarcinoma patients or extracts of HCG producing moles. However, this past art shows that the column chromatography purification processes which have been carried out are insufficient, by themselves, to produce a purified chorionic HCG fraction from pregnancy urine samples for directly producing a purified chorionic HCG fraction which can be used to produce highly specific HCG detection tests. It has always been necessary to use such column chromatography process in conjunction with other adsorption techniques in order to separate the contaminant proteins. Hamashige, S. and Arquilla, E. R.: Immunologic and Biologic Study of Human Chorionic Gonadotropin, Journal of Clinical Investigation, vol. 43, No. 6, 1964, pages 1163–1174 set out such a column chromatography method using a tris (hydroxymethyl) aminomethane buffer with a varying sodium chloride concentration gradient. In order to free the antisera produced by injection of the HCG fraction recovered from contaminant antibody it was necessary to first adsorb the antisera with non-pregnancy urine extracts in order to eliminate the contaminating antibody which was produced as a result of the impure HCG sample used for injection. Hence, this column chromatography process using the tris buffer did not allow a separation of the contaminant proteins from the pregnancy specific HCG. This effect is believed to be due to the use of the continuous saline gradient.

By contrast, even by using low activity, readily available urine preparations the present purification process allows sufficient separation of the contaminant proteins from HCG to produce a fraction having two HCG-related components and two normal urine contaminants neither of which form interfering antibodies when injected in laboratory animals. Hence, no additional adsorption techniques are necessary in order to further refine the purified chorionic gonadotropin and the process then consists of a simple, commercially attractive purification of chorionic gonadotropin using a single chromatographic column.

It is accordingly, an object of this invention to provide a simple, commercial purification process for recovering purified human chorionic gonadotropin related substances from impure HCG-containing materials.

Another object of this invention is to provide a process of recovering a purified human chorionic gonadotropin by step-wise elution of relatively pure and impure fractions from a chromatographic column filled with a cellulose or a cross-linked dextran gel having diethylaminoethyl groups attached thereto (DEAE-cellulose or DEAE-dextran) and having adsorbed thereon less than about 50 mg. of chorionic gonadotropin and contaminant proteins per gram of said cellulose or dextran as measured in their hydroxyl forms.

Yet another object of this invention is to provide a process for recovering a purified human chorionic gonadotropin from a chromatographic column filled with the above modified cellulose or dextran having adsorbed thereon an impure HCG preparation in which at least two sodium phosphate buffers having a variation in molarity can be employed to purify the HCG to any desired purity.

Another object of the present invention is to provide a process for recovering a purified gonadotropin from the above adsorbent material having adsorbed thereon chorionic gonadotropin and conaminant proteins which comprises the steps of contacting said modified cellulose or dextran with at least two sodium phosphate buffers having molarities within the range of about from 0.004 molar to 0.05 molar and pH's within the range of about from pH 5.8 to pH 7.1 and wherein the second applied phosphate buffer has a higher molarity than the first buffer employed.

Briefly described, the purification process includes the preliminary step of adsorbing onto an adsorbent material of a DEAE-cellulose or a DEAE-dextran in slurry form less than about 50 mg. of an impure chorionic gonadotropin preparation per gram of said material as measured in its hydroxyl form and thereafter contacting said material with at least two sodium phosphate buffers each having a molarity within the range of about from 0.004 molar to 0.02 molar and a pH within the range of about from pH 6.2 to pH 7.1, with the second added phosphate buffer having a higher molarity than the first buffer. If, as preferred, less than about 25 mg. of impure HCG per gram of said material is adsorbed thereon the molarity can be within a broader range of about from 0.004 molar to 0.05 molar and the pH can be within the broader range of about from pH 5.8 to pH 7.1. The first buffer can be of the same molarity and pH as the buffer used to equilibrate the adsorbent material and provides the function of removing a first fraction of contaminant proteins which are believed to be entrained in or are very loosely adsorbed on said material. The second buffer as it contacts the cellulose in the column elutes a first purified fraction of chorionic gonadotropin but leaves a second and larger fraction of mainly contaminant proteins attached to the adsorbent material. The effluent from this second contacting step is then concentrated and dried under nondenaturing conditions to recover the purified chorionic gonadotropin in dry form. If desired, a number of subsequent buffers having molarities and pH's within the above ranges may be employed. For preparation of the chromatographic column for reuse, the adsorbent material can be contacted with at least one cleaning sodium phosphate buffer having a molarity of at least about 0.1 molar and a pH of below about pH 5.8 in an amount sufficient to remove substantially all remaining contaminant proteins. A further cleaning can be carried out by applying a 1.0 N sodium hydroxide solution to the column. In this manner, with cleaning, the chromatographic column can be used for continuous commercial production. The following detailed description and examples will be more clearly understood by reference to the attached drawings in which:

Figure 1:
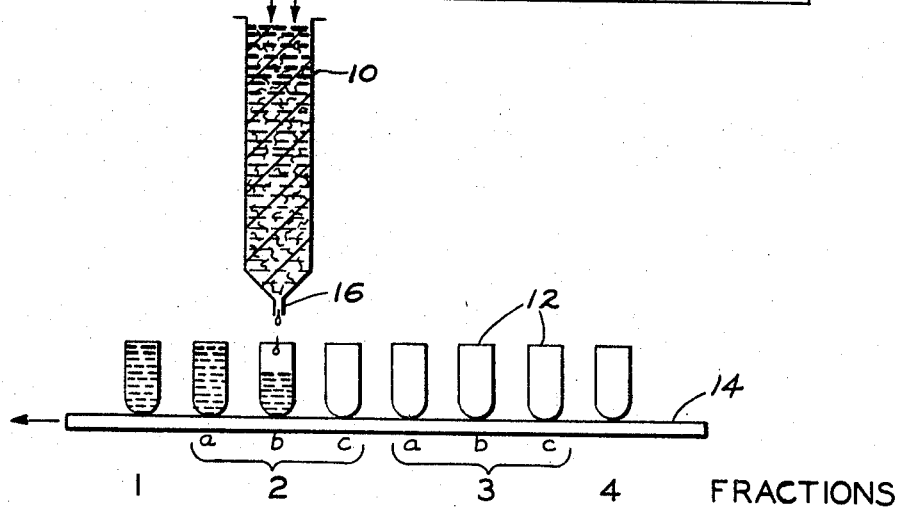
FIGURE 1 is a schematic diagram of the chromatographic column and the collection vessels for the effluents of the various buffers set out in the information boxes.

Referring now to FIGURE 1, the necessary and the optional buffers are briefly described in the information boxes. The first and second necessary sodium phosphate buffers have molarities (M) within the range of about from 0.004 M to 0.05 M and pH's within the range of about from pH 5.8 to 7.1 for a loading factor of less than about 25 mg. HCG per gram of adsorbent material, with the second buffer having a higher molarity than the first buffer. However, if a loading factor of about from 25 to 50 mg. HCG per gram of adsorbent material is used the upper limit for molarity is about 0.02 M and the lower limit for pH is about pH 6.2. The volumes of each of the two buffers as hereinafter detailed are sufficient to elute substantially all of the protein which is necessary to be eluted with each particular buffer. These two necessary sodium phosphate buffers are prepared by mixing together appropriate amounts of solutions of mono-hydrogen orthophosphate ($Na_2HPO_4$) and dihydrogen orthophosphate ($NaH_2PO_4 \cdot H_2O$). The amounts of each of the solutions of proper concentration to attain the desired molarity and pH are admixed in the standard manner for making up sodium phosphate buffers.

Due to the discovery that the contaminant proteins eluted by the first buffer are not strongly adsorbed to the DEAE-cellulose or DEAE-dextran the molarity of the second and subsequent buffers employed may be close to and only slightly higher than the molarity of their next preceding buffers. It is possible for them to have nearly the same pH so long as the molarity is slightly higher. For example, molarity increases of about 0.01 molar are sufficient to elute a substantially pure chorionic gonadotropin from the adsorbent material after each of the preceding fractions have been eluted by the preceding buffer.

These buffers are applied to the chromatographic column 10 in step-wise fashion and the effluent volumes from each buffer are collected in vessels 12 which are, preferably supported on a movable rack 14. Column 10 is prepared by suspending a quantity of DEAE-cellulose or DEAE-dextran in an amount of buffer No. 1 sufficient to produce a slurry concentration of about 60 mg. adsorbent material/ml. packed volume and adding the suspension or slurry to the column and thereafter applying a solution of a filtered commercially available HCG preparation to the slurry. When DEAE-cellulose is used it can be prepared according to Peterson and Sober: J. Am. Chem. Soc. 78: 751, (1956). The impure HCG is adsorbed onto the DEAE-cellulose or DEAE-dextran fibers and the column may then be contacted by buffer No. 1. Since this buffer elutes loosely bound contaminant proteins the entire volume of the effluent may be collected in a single vessel. Rack 14 is then moved to the left to bring another vessel under tube 16 and buffer No. 2 is applied to the column. The effluent may be collected in a single vessel or in three or more separate vessels as shown at the positions marked 2a, 2b, and 2c on rack 14. In the latter case the central vessel 2b or vessels when a greater number than three are employed, will contain the effluent with the most highly purified HCG fraction(s).

The ranges of molarity and pH which are preferably employed with loading factors of less than about 25 mg. HCG per gram of adsorbent material for the first and second buffers are as follows:

Buffer No. 1: Molarity—about 0.004 M to about 0.006 M, pH—about pH 6.8 to pH 7.1
Buffer No. 2: Molarity—about 0.007 to about 0.04 M, pH—about pH 5.9 to about pH 6.8

For commercial production using loading factors of less than about 25 mg. HCG per gram of adsorbent material it is preferred to utilize at least one third optional sodium phosphate buffer having a molarity and a pH within the broad ranges shown in FIGURE 1 and a molarity higher than the molarity of the second buffer in order to elute a second purified HCG fraction from the cellulose. For higher loading factors up to about 50 mg. HCG per gram of adsorbent material the upper limit for molarity and the lower limit for pH should be as described above. In this manner an additional quantity of purified HCG may be recovered by performing only a single additional elution step. Where a series of third buffers are used the molarities are sequentially increased. The contaminant proteins contained in the effluents from the second and third buffers do not produce antibodies in laboratory animals which interfere when present in pregnancy test systems. The effluent can be collected in a plurality of vessels 3a, 3b, 3c in the manner described for Buffer No. 2.

The third sodium phosphate buffer is made up in the same standard manner as are the first and second buffers and may preferably vary between the following limits for loading factors less than about 25 mg. HCG per gram adsorbent material:

Buffer No. 3: Molarity—about 0.04 M to about 0.05 M; pH—about pH 5.8 to about pH 5.9

After the second or subsequent purified fractions have been eluted from the cellulose a cleaning buffer is used to clean the remaining adsorbed contaminant protein from the adsorbent material so that the column 10 can be continually used in commercial production. The molarity and pH of this cleaning buffer may vary widely. Generally the molarity must be greater than about 0.1 M and the pH must be lower than about pH 5.8. For example the fourth or cleaning buffer, may have the following values.

Buffer No. 4: Molarity—about 0.1 M to about 0.4 M; pH—about pH 4.4 to about pH 5.8

It is generally a sodium phosphate buffer made up in the standard manner.

To insure that all of the contaminant protein is removed and as well as to analyze the contaminant protein in fractionated samples a series of cleaning buffers having molarities and pH's within the above range can be employed to serially elute various groups of contaminant proteins. For example, the first of these cleaning buffers may have a molarity of about 0.1 M and a pH of about 5.8, a second cleaning buffer can have a molarity of about 0.4 M and a pH of about 5.2 and a third can have a molarity of 0.4 M and a lower pH of about pH 4.4 in 2 M NaCl solution. The effluents from the cleaning buffers can be collected in a single vessel or a series of vessels for analytical work.

To insure that the cellulose is completely free of any contaminant materials 1 N sodium hydroxide solution may then be run through the column until no protein is eluted.

It is also possible to use an initial low molarity buffer if its molarity is less than about 0.004 and its pH is greater than about pH 7.1 without eluting any significant amount of HCG or closely related protein substance.

Thus, the contaminant proteins eluted by the first buffer are placed in a first collection vessel as shown by FIGURE 1. This material can be saved for future analysis or discarded. The fraction of purified HCG eluted by the second buffer can be collected in a single collection vessel or can be collected in at least three vessels with appropriate markings so that the purest segment of the purified fraction can be isolated in the middle collection vessel or vessels. The same manner of collection can be used for the purified HCG fractions eluted by the third and subsequent buffers, when such are used. The fourth fraction eluted by the cleaning buffer is collected in a fourth collection vessel or series of vessels and saved for future analysis or discarded.

Figure 2:
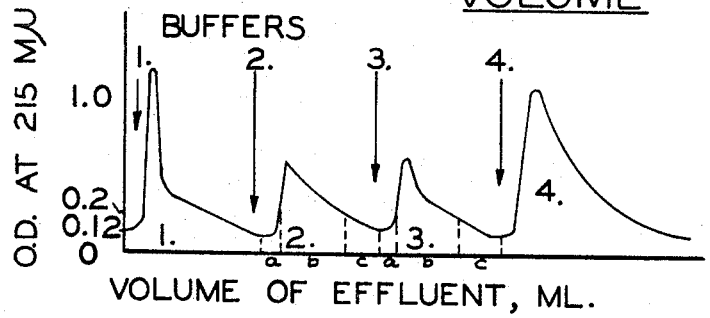
FIGURE 2 shows a graph of the volume of each of the serially collected effluents plotted against the optical density of these effluents.

It has generally been found advantageous to continuously monitor the optical density (O.D.) of the various effluents from the chromatographic column 10 of FIGURE 1 by a continuous recording spectrophotometer set for recording at 215 m$\mu$. In this manner an optical density graph such as FIGURE 2 is obtained when both third and fourth buffers are used in the purification process. The addition of the buffers is shown by the arrows numbered 1, 2, 3, 4, respectively. The first buffer is added and the O.D. (compared to distilled water) continuously monitored until the peak is passed and the optical density returns to approximately the potical density of Buffer No. 1 which is about 0.12 O.D. The second buffer is then applied to the chromatographic column and the first effluent is collected as portion 2a as shown in FIGURE 2. This first portion is discarded when only the purest fraction is sought since it contains some residual contaminant proteins not eluted by Buffer No. 1. The material eluted by Buffer No. 2 is then collected as a second portion marked 2b and a third portion marked 2c. The effluent in this latter portion 2c is discarded when only the purest HCG fraction is sought. Such fraction can be identified by the fact that it exhibits the highest O.D., generally above 0.2 O.D.

In a like manner the third and subsequent fractions are recovered by elution with the additional buffers and collected as separate portions 3a, 3b, and 3c so that a similar purification is achieved. The fourth buffer is added when the O.D. of the effluent from the last of the buffers approaches the O.D. of the last buffer itself and the large end fraction of contaminant proteins is then taken off from the adsorbent material.

The monitoring at 215 m$\mu$ is necessary due to the low concentration of proteins in the effluent which is, in part, caused by the low column loading which is used to obtain the greater sensitivity to the individual buffers. In this manner the purified HCG may be eluted from the column without contamination with the proteins which are eluted on either side of the purified fractions.

Figure 3:
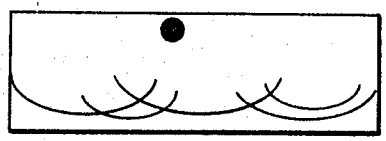
FIGURE 3 is a schematic representation of an immuno-electrophoresis pattern obtained by the reaction of the antisera to an impure HCG preparation against a spot of normal urine concentrate.
Figure 4:
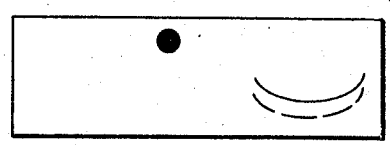
FIGURE 4 is a schematic representation of the immuno-electrophoresis pattern obtained by reacting the antisera produced from a purified HCG fraction obtained by the present invention against a spot of normal urine concentrate.
Figure 5:
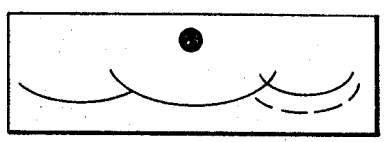
FIGURE 5 is a schematic representation of an immuno-electrophoresis pattern obtained by reacting the antisera produced from a purified HCG fraction obtained by the present invention against a spot of pregnancy urine concentrate.

FIGURES 3, 4 and 5 demonstrate the purity of the HCG fraction 2 or 3 of FIGURE 2. FIGURE 3 shows a diagram of an electrophoresis separation pattern obtained by reacting a spot of normal urine concentrate against the antisera recovered after injection of laboratory animals with a representative sample of a commercial or impure HCG preparation. It can be observed that there are a number of antibodies which give precipitin lines with the normal urine concentrate which mean that contaminant proteins contained in the commercial HCG preparation form antibodies in the laboratory animals. It has been found that some of these proteins and their respective antibodies cause false patterns in pregnancy testing conducted by hemagglutination.

FIGURE 4 shows the testing of a spot of normal urine concentrate by the same electrophoretic method against the antisera produced to the purified fractions 2 or 3 recovered by the present purification process. Only one definite and one faint precipitin line results. Thus, the antisera produced in laboratory animals to purified fractions 2 or 3 contain a single, or perhaps 2 separate protein contaminants which are found in normal urine concentrates, but it has been found that this protein contaminant does not interfere with hemagglutination testing according to the above patent. Thus the HCG has been purified to the ultimate extent necessary for commercial utilization thereof.

FIGURE 5 shows a diagram of the electrophoretic pattern obtained by reacting a spot of pregnancy urine concentrate with the antisera produced in laboratory animals against purified fractions 2 or 3. The same distinct and faint precipitin lines are seen as in FIGURE 4. In addition, a main precipitin line of HCG or closely related protein is found together with one other specific line. The main precipitin line is that directly below the spot of pregnancy urine concentrate. This line represents the reaction between the closely related HCG protein present in the pregnancy urine concentrate and its antibody from the antisera.

The other precipitin line located to the left of the central line represents a second HCG-related protein and indicates that this particular protein is being carried along during the entire recovery and purification processes.

The loading of the DEAE-cellulose or DEAE-dextran is accomplished by dissolving a predetermined amount of impure HCG preparation in several ml. of Buffer No. 1, and applying the resulting solution to the slurry in the column. The HCG solution may be applied directly, or if desired, it may be optionally dialyzed or filtered in order to remove some of the entrained small molecular impurities. Dialysis is carried out by dialyzing the HCG solution against Buffer No. 1 and the more preferred pretreatment of filtration of the HCG is accomplished by dissolving the quantity to be used in several ml. of Buffer No. 1 and passing the solution through a column containing a modified dextran gel obtained by fermentation of sugar. A filtration material of this type is marketed under the trade name Sephadex G-25 and has a particle size of 20–80 microns and has a packing density of 0.2 g. per ml. in a suspending liquid. The modification of the sugar by fermentation is by cross-linking of the particles at the 1–6 linkages of the polysaccharide molecules.

The effluent recovered after filtration through the dextran gel column contains approximately 95% of the original HCG material. The useful portions of the effluent are determined by monitoring the effluent at 215 m$\mu$ and saving those portions of the effluent which have optical densities greater than about 0.1.

The filtered HCG preparation then consists of nearly the same amount of HCG preparation as originally present but now dissolved in about 10 ml. of Buffer No. 1. This solution is applied to the DEAE-cellulose or DEAE-dextran column which has previously been equilibrated with Buffer No. 1. The HCG solution is applied in a limited amount so that a loading factor less than about 50 mg. HCG/g. of adsorbent material or 3.0 mg. HCG/ml. packed column volume both measured on the basis of the hydroxyl form of the adsorbent material is attained.

For purposes of this invention the impure HCG commercial samples can be obtained from any of the readily available commercial sources. These materials may vary markedly in specific activity, measured as International Units per mg. (I.U./mg.), with an HCG preparation from the first organization having approximately 240 I.U./mg., the second showing 2500 I.U./mg. and the last showing an activity of 6500 I.U./mg. In general, any of the commercially available HCG preparations or any extracts prepared from HCG containing fluids can be employed for the present purification process with similar results.

The loading of HCG onto the DEAE-cellulose or DEAE-dextran in a proportion of less than about 50 mg. impure HCG per gram of said adsorbent material is much lower than the loading in most chromatographic columns. In this manner greater sensitivity for separation can be achieved with the result that the second fraction recovered is a highly purified HCG preparation.

The volume of the first buffer used in the purification process must be sufficient to elute a large percentage of the loosely bound protein contaminants from the adsorbent material. This volume of buffer depends upon the total amount of HCG preparation used for loading of the column, and hence, depends upon the size of the chromatographic column. The most practical manner of determining the necessary volume is to apply Buffer No. 1 to the column and continuously measure the O.D. of the effluent. The curve established will rise to a maximum and then decrease to a value which approximates the O.D. of pure Buffer No. 1 as shown by the curve for fraction 1 of FIGURE 2. Continuous addition of any significant volume of Buffer No. 1 passed this O.D. value accomplishes no useful purpose, except to assure that all of the contaminant protein which has been eluted by the first buffer is drained from the column before the second buffer is applied. This is, particularly, a worthwhile precaution when long columns having low HCG leading are employed.

The purification process of this invention may also be conducted in a batch-wise fashion by mixing the various buffers sequentially with the absorbent material slurry by draining the effluent from each batch mixing before contacting the cellulose with the subsequent buffer. In such case the same buffers and volumes thereof are used as are used for column elution. However, in order to monitor the O.D. of the effluents to determine the necessary volumes of the buffers it is preferably to divide each predetermined buffer volume into several portions so that a change in O.D. over the course of elution with each individual buffer can be easily measured.

Figure 6:
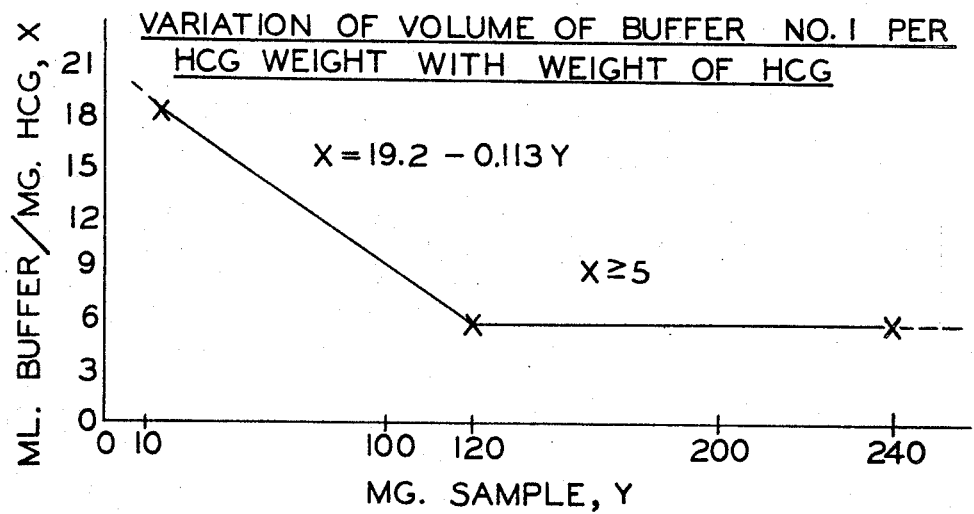
FIGURE 6 shows the relationship of the weight of impure HCG sample, Y, to the volume of buffer No. 1 per weight of impure HCG loaded on the cellulose, X.

When a straight batch-wise elution is desired the minimum or necessary volume of Buffer No. 1 can be predetermined by reference to FIGURE 6. This figure shows the relationship of the total weight of sample, Y, in the column to the volume of buffer per weight of sample in the column for the preferred loading factors of about 17 mg. HCG/g. of adsorbent material. For columns containing from approximately 10 mg. of impure HCG preparation to 120 mg. HCG preparation the minimum ratio of the ml. of buffer per mg. of sample X, is controlled by the equation $$X = 19.2 - 0.113Y$$

whereas for columns containing greater than 120 mg. of HCG preparation at least 5 ml. of Buffer No. 1 are required for each mg. of impure HCG present in the column which relationship may be expressed as $$X \geq 5$$

The above relationships are intended to apply over the entire range of HCG sample weights for loading factors of about 17 mg. HCG/g. of adsorbent material and hence column sizes with which the present process can be practiced. For higher loading factors up to about 50 mg. HCG/g. of adsorbent material it has been found that X should be between 5 ml. Buffer No. 1 mg. HCG and the amount calculated by the above equation for columns containing from 10 to 120 g. HCG.

In order to apply the present purification process to commercial recovery and purification of HCG preparations at least approximately 2 mg. of purified HCG and any associated contaminant proteins must be eluted by the second buffer. That is the second buffer must be responsible for eluting at least about this amount of HCG, even though the end portion of the first protein fraction might still be coming off of the column when Buffer No. 2 is being applied to the column. Any greater amount of Buffer No. 2 can be employed with the caution that at very great volumes no advantage will occur since the protein will be eluted in such small concentrations as to make the continued employment of Buffer No. 2 impractical.

Where a third or subsequent sodium phosphate buffers are employed in order to recover addition purified fractions the same amount of each addition buffer is required, that is, an amount sufficient to elute at least about 2 mg. of the adsorbed HCG and associated contaminant proteins.

As stated above in the description of FIGURE 2 the most commercial manner in which the purification process can be carried out is to monitor the effluent of each of the buffers by a spectrophotometer set at 215 m$\mu$ and to terminate the use of the particular buffer when the O.D. of the effluent approaches 0.12 or the O.D. of the pure buffer. A spectrophotometer set at 215 m$\mu$ is ten to twenty times as sensitive to the proteins of the present invention as one set at the more usual 280 m$\mu$. This is demonstrated by the fact that at 215 m$\mu$ an O.D. of 11.2 is recorded for 1.0 mg. HCG/ml. Buffer No. 2, whereas at 280 m$\mu$ an O.D. of only 0.55 is recorded for a similar concentration. Generally, wavelengths of about from 190 m$\mu$ to 240 m$\mu$ provide sufficient distinction for use, particularly at higher HCG concentrations.

A preferred manner of measuring the amounts of HCG eluted by each of the buffers is to use the relationship that one (1) mg. of HCG protein is equivalent to 10 protein units (P.U.), where P.U. is defined as the product of the volume of effluent buffer times the average O.D. ($\overline{O.D.}$) of that volume measured at 215 mμ. This may be expressed as:

P.U.=Buffer effluent volume×$\overline{O.D.}$

The above objects and detailed description will be rendered more specific to those skilled in the art by the following examples in which parts and percentages are by weight and concentrations of buffers are given as molarity, M, unless otherwise specified.

Example I

Buffers: Molarity—pH
No. 1 _____ 0.005 M, pH 7.0
No. 2 _____ 0.0175 M, pH 6.3

Buffer No. 1 was made up by mixing 60 volume parts of an aqueous solution containing 0.71 g. of anhydrous mono-hydrogen orthophosphate per liter with 40 volume parts of an aqueous solution containing 0.69 g. of dihydrogen orthophosphate ($NaH_2PO_4 \cdot H_2O$) per liter. The pH can be adjusted to the exact value of pH 7.0 by addition of a small quantity of either solution.

Buffer No. 2 was made up by mixing 27 volume parts of an aqueous solution containing 2.48 g. of mono-hydrogen orthophosphate per liter with 73 volume parts of an aqueous solution containing 2.42 g. of dihydrogen orthophosphate per liter. A similar pH adjustment as used for Buffer No. 1 can also be used for this buffer.

A first 2.2 cm. x 17 cm. glass column was set up with a 60 ml. suspension of modified dextran gel (Sephadex G-25) in Buffer No. 1. The concentration of this suspension was about 0.2 g./ml. A 3 cm. x 30 cm. glass column was set up by adding thereto a volume sufficient to make 240 ml. packed column volume of DEAE-cellulose suspended in Buffer No. 1 after the cellulose was equilibrated with Buffer No. 1. About fourteen (14) g. of a DEAE-cellulose in hydroxyl form having a fiber length of between 100 to 300 microns and an adsorption capacity of 0.9±0.1 milliequivalent per gram as measured with chloride ion were employed. A quantity of 240 mg. of an HCG preparation was then dissolved in about 5 to 10 ml. of Buffer No. 1.

This HCG solution was first filtered through the modified dextran column with addition of more Buffer No. 1 and the effluent monitored at 215 mμ by a spectrophotometer and collected in 20 fractions of 6 ml. volume each. Fractions 4 through 10 contained approximately 95% of the original HCG preparation and these were pooled and then applied to the DEAE-cellulose column. The amount of HCG adsorbed onto the cellulose in the packed column was sufficient to give a loading factor of approximately 17 mg. of impure HCG per gram of cellulose.

A number of 14 ml. fractions were drained from the DEAE-cellulose column using 1300 to 1500 ml. of Buffer No. 1 and collecting in separate vessels using a Gilson fraction collector. At the end of this volume of Buffer No. 1 the O.D. monitored by the spectrophotometer set at 215 mμ was approximately equivalent to the O.D. of the buffer as freshly prepared, which was less than 0.12 O.D. Buffer No. 1 was then terminated and the collection vessels set aside. A volume of 1600 to 1800 ml. of Buffer No. 2 was then applied to the column to elute a purified HCG fraction and the effluent was collected in the same manner as the effluent of Buffer No. 1. When this volume had been charged through the column the O.D. of the effluent was approximately equivalent to freshly prepared Buffer No. 2, or below about 0.12 O.D. The 14 ml. middle fractions obtained from the effluent of Buffer No. 2 which exhibited O.D. values of above about 0.2 were then pooled, dialyzed in distilled water, and they lyophilized under nondenaturing conditions to recover approximately 20 to 24 mg. of purified HCG. This HCG corresponds to the middle fractions denoted as fractions 2b in FIGURES 1 and 2.

This purified HCG obtained showed essentially the electrophoretic patterns illustrated in FIGURES 4 and 5. By the use of this HCG a pregnancy test of improved sensitivity can be constructed.

Example II

Buffers: Molarity—pH
No. 1 _____ 0.005 M, pH 7.0.
No. 2 _____ 0.0175 M, pH 6.3.
No. 3 _____ 0.04 M, pH 5.9.

Buffers Nos. 1 and 2 were made up as stated in Example I and Buffer No. 3 was made by mixing 8 volume parts of an aqueous solution containing 5.68 g. of anhydrous mono-hydrogen orthophosphate per liter with 92 volume parts of an aqueous solution containing 5.52 g. of dihydrogen orthophosphate per liter with a similar pH adjustment as stated for Buffer No. 1 when necessary.

A modified dextran gel column was set up following the procedure described in Example I. A 2.2 cm. x 30 cm. glass column was set up by adding thereto a volume of 120 ml. of DEAE-cellulose suspended in Buffer No. 1 after the cellulose was equilibrated with Buffer No. 1. Seven (7) g. of the same type of DEAE-cellulose as descibed in Example No. I was used. A quantity of 120 mg. of an HCG preparation were then dissolved in about 5 ml. of Buffer No. 1.

This HCG solution was first filtered through the modified dextran column in the manner described for Example I and the effluent was collected in 6 ml. fractions. The middle fractions contained approximately 95% of the original HCG preparation and these were pooled and then applied to the DEAE-cellulose column. The amount of HCG absorbed onto the cellulose was sufficient to result in a loading factor of about 17 mg. of impure HCG per gram of cellulose.

Buffer Nos. 1 and 2 were then applied sequentially to the loaded, packed column in volumes of 700 ml. each. The procedure set out in Example I was followed with the result that about one-half or 10 to 12 mg. of purified HCG was recovered from the effluent of Buffer No. 2.

In order to obtain a second purified HCG fraction, 800 ml. of Buffer No. 3 was then applied to the column and a number of 14 ml. fractions of effluent collected. At the end of this volume the O.D. monitored by the spectrophotometer set at 215 mμ was about equivalent to the O.D. of the buffer as freshly prepared, which was less than 0.12 O.D. The middle fractions which exhibited O.D. values of above about 0.2 were then pooled, dialyzed and lyophilized in the same manner as for the Buffer No. 2 fractions. An amount of 10 to 12 mg. of purified HCG were recovered by this additional procedure using Buffer No. 3.

The antisera to both purified HCG fractions showed essentially the electrophoretic patterns illustrated in FIGURES 4 and 5.

Example III

Buffers and cleaning solution: Molarity—pH
No. 1 _____ 0.005 M, pH 7.0.
No. 2 _____ 0.0175 M, pH 6.3.
No. 3 _____ 0.04 M, pH 5.9.
No. 4 _____ 0.1 M, pH 5.8.
No. 5 _____ 0.4 M, pH 5.2.
No. 6 _____ 0.4 M, pH 4.4 in 2 M NaCl.
No. 7 _____ 1.0 N NaOH.

For an analytical determination of the various contaminants protein fractions as well as to recover two purified HCG fractions the above buffers were applied to similar columns as employed in Example I.

The first three buffers were made up as set out in Examples I and II. Buffer No. 4 was made by mixing 8 volume parts of an aqueous solution containing 14.19 g. of anhydrous mono-hydrogen orthophosphate per liter with 92 volume parts of an aqueous solution containing 13.8 g. of dihydrogen orthophosphate per liter and adjusting to pH 5.8 with one of the solutions.

For Buffer No. 5 an aqueous solution containing 55.2 g. of dihydrogen orthophosphate per liter was titrated to pH 5.2 with an aqueous solution containing 56.79 g. of mono-hydrogen orthophosphate per liter. Buffer No. 6 was prepared by adding 116.9 g. of NaCl/liter to a 0.4 M solution of dihydrogen orthophosphate and titrating this solution to pH 4.4 with an aqueous solution of 0.4 M mono-hydrogen orthophosphate to which had been added 116.9 g. of NaCl/liter. The 1.0 N NaOH was made up in the standard manner.

For this run about 11 mg. of HCG preparation (2000–4000 I.U. per mg.) was dissolved in about 1 to 2 ml. of Buffer No. 1. This concentrated solution was filtered through a 1 cm. x 20 cm. glass column filled with a suspension of a modified dextran gel in Buffer No. 1 and collected in 10 fractions of 3 ml. each. Each of the fractions was monitored at 215 m$\mu$ and those fractions containing the unretarded portions (fractions 3–5) were retained and pooled as filtered HCG preparation. This material consisted of about 95% of the original. This HCG preparation was then applied to a 1 cm. x 20 cm. column filled with a suspension of 0.915 g. of DEAE-cellulose measured as its hydroxyl form in Buffer No. 1 after the cellulose had be equilibrated with the buffer. The concentration of the cellulose in the suspension was about 1 g. cellulose per 17 ml. of packed column volume and the cellulose employed had the same specifications as that used for Example I.

A 200 ml. of Buffer No. 1 was then applied and the effluents collected in 3 ml. fractions monitored at 215 m$\mu$. This volume was sufficient to allow the O.D. to rise through a maximum and return to about 0.07 O.D. For these measurements a flow cell and a U.V. monitor spectrophotometer and fraction collector were employed.

Buffer No. 2 was used in an amount of about 190–225 ml. which was sufficient to reduce the O.D. of the second peak to about 0.07 O.D. and the 3 ml. fractions continuously collected. In a similar manner about 135 to 180 ml. of Buffer No. 3 were sent through the column and collected in 3 ml. fractions. The volumes of the remaining buffers applied were: Buffer No. 4, 160 to 270 ml.; Buffer No. 5, 160 to 200 ml.; and Buffer No. 6, 90 to 120 ml. All effluents were collected in the same manner as above set out. After the sixth buffer the strong cleaning solution of 1 N sodium hydroxide solution, No. 7, was then sent through the column to clean the cellulose for its next use. Each of the fractions were then pooled and dialyzed in distilled water and lyophilized under nondenaturing conditions and then analyzed by immunoelectrophoretic techniques. The patterns obtained by antisera to fractions 2 and 3 are essentially those illustrated by FIGURES 4 and 5.

By this manner of serial use of three cleaning buffers fraction 4 of FIGURE 2 was split into three separate peaks. The first two obtained by Buffers Nos. 4 and 5 were approximately of the same size and shape as the fraction eluted by Buffer No. 3 while the sixth fraction eluted by Buffer No. 6 was extremely small.

By estimating the amount of protein in each of the peaks on the basis of U.V. absorption the amounts of proteins eluted in each separate peak as a percent based on the total U.V. absorbing material eluted were calculated for fractions 1, 2 and 3 as: 28.6%, 15.3% and 12.9%, respectively.

Example IV

| Buffers: | Molarity—pH |
|---|---|
| No. 1 | 0.005 M, pH 7.0. |
| No. 2 | 0.0175 M, pH 6.3. |
| No. 3 | 0.04 M, pH 5.9. |

The above sodium phosphate buffers are made up by the procedure described in Examples I and II.

A quantity of 30 mg. of an impure HCG preparation obtained from Vitamerican Corp. was dissolved in 1 to 2 ml. of Buffer No. 1 and filtered through a modified dextran gel column in the manner set out for Example III, using the same volume of Buffer No. 1 and collection technique. The middle fractions recovered were then loaded onto a DEAE-cellulose column as used for Example III to give a loading factor of 25.5 mg. HCG preparation per gram of DEAE-cellulose. This was a loading factor of 1.5 mg. HCG preparation per ml. of packed DEAE-cellulose volume.

A volume of 260 ml. of Buffer No. 1 was then passed through the column and the effluent continuously monitored and collected in the manner described by Example III. This amount of Buffer No. 1 was sufficient to allow the O.D. measured at 215 m$\mu$ to rise through a maximum and then decrease to about 0.07 O.D. A volume of 250 ml. of Buffer No. 2 was then applied to the column and the effluent monitored and collected in the same manner. Buffer No. 3 was then passed through the column in an amount of 200 ml. and the effluent monitored at 215 m$\mu$ and collected. The middle fractions of the effluents of Buffers Nos. 2 and 3 were separately pooled, dialyzed and lyophilized in the manner set out in Example II. Immuno-electrophoretic studies were then carried out with the result that fraction 2 was identical to the pattern shown by the same fraction of Example I. There was a faint contaminant protein precipitin line in the electrophoretic pattern for fraction 3 which was not present in the corresponding patterns for Examples I through III, which indicated that the loading factor of 25.5 mg. HCG per gram cellulose in the column was approaching a maximum. For larger loading factors the amount of contaminant protein in fraction 3 increases, however fraction 2 remains pure for loading factors up to about 50 mg. HCG per gram cellulose, especially when the second and any subsequent buffers are maintained at molarities of lower than about 0.02 M and pH's above about pH 6.2.

Example V

A diethylamino ethyl modified dextran gel was used as an adsorbent material for a purification which otherwise closely followed Example III. The DEAE-modified dextran gel employed was in the form of beads having diameters in the range of about 40 microns to about 120 microns and had an adsorption capacity of 3.5±0.5 milliequivalents per gram as measured with chloride ion. A modified dextran of this description is available under trade designation DEAE-Sephadex A–50. A sufficient amount of modified dextran gel was used in the chromatographic column to attain a packed column volume, which amounted to a concentration of about 1 g. dextran per 17 ml. of packed column volume. After equilibrating the column with Buffer No. 1, 11 mg. HCG was loaded onto the column to attain a loading factor of about 17 mg. HCG/g. dextran. The following amounts of the six sodium phosphate buffers were then sequentially used to elute the protein from the column; No. 1—130 ml., No. 2—100 ml., No. 3—100 ml., No. 4—150 ml., No. 5—90 ml., and No. 6—30 ml. The O.D. curve established showed higher base line values than for the preceding examples so that 0.1 to 0.2 O.D. was used for the minimum points according to FIGURE 2. Fractions 2 and 3 showed the above same immuno-electrophoretic patterns as the same fractions from Example III.

In summary, a process of purifying commercially available HCG preparation by step-wise use of sodium phosphate buffers of increasing molarity to elute HCG fractions from a chromatographic column has been set out. At least two, and preferably three buffers are necessary for maximum efficiency of recovery of purified HCG fractions.

What is claimed is:

1. The process of recovering a purified human chorionic gonadotropin from an adsorbent material selected from the class consisting of cellulose and cross-linked dextran gel, having diethylaminoethyl groups attached thereto and having an impure mixture of human chorionic gonadotropin and contaminant proteins adsorbed thereon comprising the steps of sequentially contacting said adsorbent material with at least two sodium phosphate buffers having molarities within the range of about from 0.004 M to 0.05 M and pH's within the range of about from pH 5.8 to pH 7.1 for amounts of adsorbed impure mixture of less than about 25 mg. per gram of said adsorbent material measured in its hydroxyl form and having molarities within the range of about from 0.004 M to 0.02 M and pH's within the range of about from pH 6.2 to pH 7.1 for amounts of adsorbed impure mixture of about from 25 to 50 mg. per gram of said adsorbent material measured in its hydroxyl form, the first of said buffers being used in at least an amount sufficient to allow the optical density of the effluent to rise through a maximum and decrease to approximately the optical density of said first buffer, the second and any subsequently buffers having a higher molarity than each of their next preceding buffers and each being used in an amount sufficient to elute at least about 2 mg. of chorionic gonadotropin and contaminant proteins from said adsorbent material, collecting the effluents of said buffers by monitoring at about 215 m$\mu$, and drying the effluents of said second and any subsequent buffers under nondenaturing conditions to recover purified chorionic gonadotropin.

2. A process according to claim 1 including the step of contacting said cellulose after said collecting step with at least one sodium phosphate cleaning buffer having a molarity of at least about 0.1 M and a pH of below about pH 5.8 in an amount sufficient to remove substantially all remaining contaminant protein from said adsorbent material.

3. A process according to claim 1 wherein the minimum amount of said first buffer is defined by the relationship $$X = 19.2 - 0.113Y$$

for amounts of chorionic gonadotropin and contaminant proteins of about from 10 mg. to 120 mg., and the relationship $$X \geq 5$$

for amounts greater than about 120 mg., where $X$=ml. of buffer/mg. of chorionic gonadotropin and contaminant proteins and $Y$=the total amount of chorionic gonadotropin and contaminant proteins adsorbed on said adsorbent material, and wherein said chorionic gonadotropin is adsorbed on said material in an amount of less than about 17 mg./g. of said material.

4. A process according to claim 1 wherein the adsorbent material of said contacting step is suspended as a slurry in said first buffer in a chromatographic column and wherein said first and said second buffers are sequentially run through the column.

5. A process according to claim 1 wherein the 2 mg. of chorionic gonadotropin and contaminant proteins eluted by said second buffer is measured as about 20 protein units (P.U.) defined by the relationship $$\text{P.U.} = \text{Buffer effluent volume} \times \overline{\text{O.D.}}$$

where $\overline{\text{O.D.}}$ is the average optical density of said effluent measured at a wavelength 215 m$\mu$.

References Cited
UNITED STATES PATENTS
3,290,216  12/1966  Toccoceli et al. _____ 167—74

U.S. Cl. X.R.

260—112.5; 424—12, 99